United States Patent
Kodaka et al.

(10) Patent No.: US 6,459,972 B2
(45) Date of Patent: Oct. 1, 2002

(54) DIAGNOSTIC APPARATUS AND METHOD FOR MOTOR DRIVEN POWER-ASSISTED STEERING SYSTEM

(75) Inventors: Takeshi Kodaka, Tokyo; Kazuya Yamano, Kanagawa, both of (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/880,770

(22) Filed: Jun. 15, 2001

(30) Foreign Application Priority Data

Jun. 16, 2000 (JP) ........................................ 2000-181907

(51) Int. Cl.[7] .............................. G06F 17/00; G05D 1/00
(52) U.S. Cl. .............................. 701/43; 701/29; 701/34; 180/400; 180/428; 180/445
(58) Field of Search .............................. 701/43, 41, 42, 701/29, 34, 36; 180/428, 445, 443, 400

(56) References Cited

U.S. PATENT DOCUMENTS

| | | | | |
|---|---|---|---|---|
| 4,624,334 A | * | 11/1986 | Kelledes et al. | 180/446 |
| 5,053,966 A | * | 10/1991 | Takahashi et al. | 180/446 |
| 5,360,077 A | * | 11/1994 | Nishimoto et al. | 180/446 |
| 5,406,155 A | * | 4/1995 | Persson | 310/171 |
| 5,552,684 A | * | 9/1996 | Wada et al. | 180/404 |
| 5,563,790 A | * | 10/1996 | Wada et al. | 180/446 |
| 5,623,409 A | * | 4/1997 | Miller | 180/443 |
| 5,839,537 A | * | 11/1998 | Nishino et al. | 180/443 |
| 5,988,310 A | * | 11/1999 | Nishino et al. | 180/443 |
| 5,992,556 A | * | 11/1999 | Miller | 180/446 |
| 6,008,599 A | * | 12/1999 | Beck | 180/446 |
| 6,046,560 A | * | 4/2000 | Lu et al. | 180/443 |
| 6,070,692 A | * | 6/2000 | Nishino et al. | 180/443 |
| 6,107,767 A | * | 8/2000 | Lu et al. | 318/432 |
| 6,148,948 A | * | 11/2000 | Shimizu et al. | 180/446 |

FOREIGN PATENT DOCUMENTS

JP 11-342859 12/1999

* cited by examiner

Primary Examiner—William A. Cuchlinski, Jr.
Assistant Examiner—Olga Hernandez
(74) Attorney, Agent, or Firm—Foley & Lardner (57) ABSTRACT

In diagnostic apparatus and method for a motor-driven power-assisted steering system, an abnormality determining section detects a state in which the detected normal/reverse drive current indicates an opposite to a direction of the normal/reverse revolution drive torque and determines whether the state is in excess of a predetermined abnormality determination criterion so as to determine an occurrence in abnormality of the power-assisted steering system, the abnormality determining section comprising a sensitivity reducing section that varies a sensitivity of the abnormality determination criterion in a decrease direction as an absolute value of the detected normal/reverse drive current becomes smaller.

20 Claims, 8 Drawing Sheets

DIAGNOSTIC APPARATUS AND METHOD FOR MOTOR DRIVEN POWER-ASSISTED STEERING SYSTEM

BACKGROUND OF THE INVENTION a) Field of the Invention

The present invention relates to diagnostic apparatus and method for a motor driven power-assisted steering system of an automotive vehicle.

b) Description of the Related Art

A Japanese Patent Application First Publication No. Heisei 11-342859 published on Dec. 14, 1999 exemplifies a previously proposed diagnostic apparatus for a motor driven power-assisted steering system of an automotive vehicle.

The previously proposed diagnostic apparatus includes a direction abnormality detection circuit to determine whether there is an abnormality in a power-assisted steering direction on the basis of a sub torque signal from a steering torque sensor and a command from a CPU (Central Processing Unit) of a control unit.

The direction abnormality detection circuit determines the abnormality in the power-assisted steering direction depending upon whether a normal/reverse revolution drive command current to command a revolution drive of the motor and a normal/reverse revolution drive command current to command a revolution drive direction.

SUMMARY OF THE INVENTION

However, since the actual normal/reverse drive current supplied to the electric motor includes noises, a current which is reverse to the normal/reverse revolution drive command current is instantaneously caused to flow to the electric motor irrespective of the fact that the power-assisted steering direction is normal in a case where the steering torque is small and an absolute value of the normal/reverse drive current is small.

Therefore, even if the operation of the power-assisted steering system is normal, the diagnostic apparatus erroneously determines that the power-assisted direction is abnormal and a fail-safe facility is activated on the basis of this erroneous determination so that the power-assisted steering is stopped.

Although this problem would be solved to some degree by setting a sensitivity in an abnormal criterion to a duller direction, this causes a delay in the abnormality determination due to a reduction in a sensitivity when the abnormality occurs in the power-assisted steering system in a case where the steering torque is large and the absolute value of the normal/reverse drive current is large.

It is, hence, an object of the present invention to provide improved diagnostic apparatus and method for a motor driven power-assisted steering system of the vehicle which can reduce an erroneous determination of abnormality due to an influence of the noises included in the normal/reverse drive current even if the steering torque is small and the current value of the normal/reverse drive current supplied to the motor is small without reduction in the sensitivity in the abnormality determination when the power-assisted steering operation is required.

The above-described object can be achieved by a diagnostic apparatus for a motor driven power-assisted steering system of an automotive vehicle, comprising: a control section that regulates a magnitude of a drive torque and a direction of the drive torque to be applied to an electric motor in a form of a normal/reverse drive torque command current; a drive current detection circuit to detect a normal/reverse drive current to be supplied to the motor; an abnormality determining section that detects a state in which the detected normal/reverse drive current indicates an opposite to a direction of the normal/reverse drive torque command current and determines whether the state is in excess of a predetermined abnormality determination criterion so as to determine an occurrence in abnormality of the power-assisted steering system, the abnormality determining section comprising a sensitivity reducing section that varies a sensitivity of the abnormality determination criterion in a decrease direction as an absolute value of the detected normal/reverse drive current becomes smaller.

The above-described object can also be achieved by providing a diagnostic method for a motor driven power-assisted steering system of an automotive vehicle, comprising: regulating a magnitude of a drive torque and a direction of the drive torque to be applied to an electric motor in a form of a normal/reverse drive torque command current: detecting a normal/reverse drive current to be supplied to the motor; detecting a state in which the detected normal/reverse drive current indicates an opposite to a direction of the normal/reverse drive torque command current; determining whether the state is in excess of a predetermined abnormality determination criterion so as to determine an occurrence in abnormality of the power-assisted steering system; and varying a sensitivity of the abnormality determination criterion in a decrease direction as an absolute value of the detected normal/reverse drive current becomes smaller.

The other objects and features of this invention will become understood from the following description with reference to the accompanying drawings.

DETAILED DESCRIPTION OF THE PREFERRED EMBODIMENT

Reference will hereinafter be made to the drawings in order to facilitate a better understanding of the present invention.

(First Embodiment)

Figure 1:
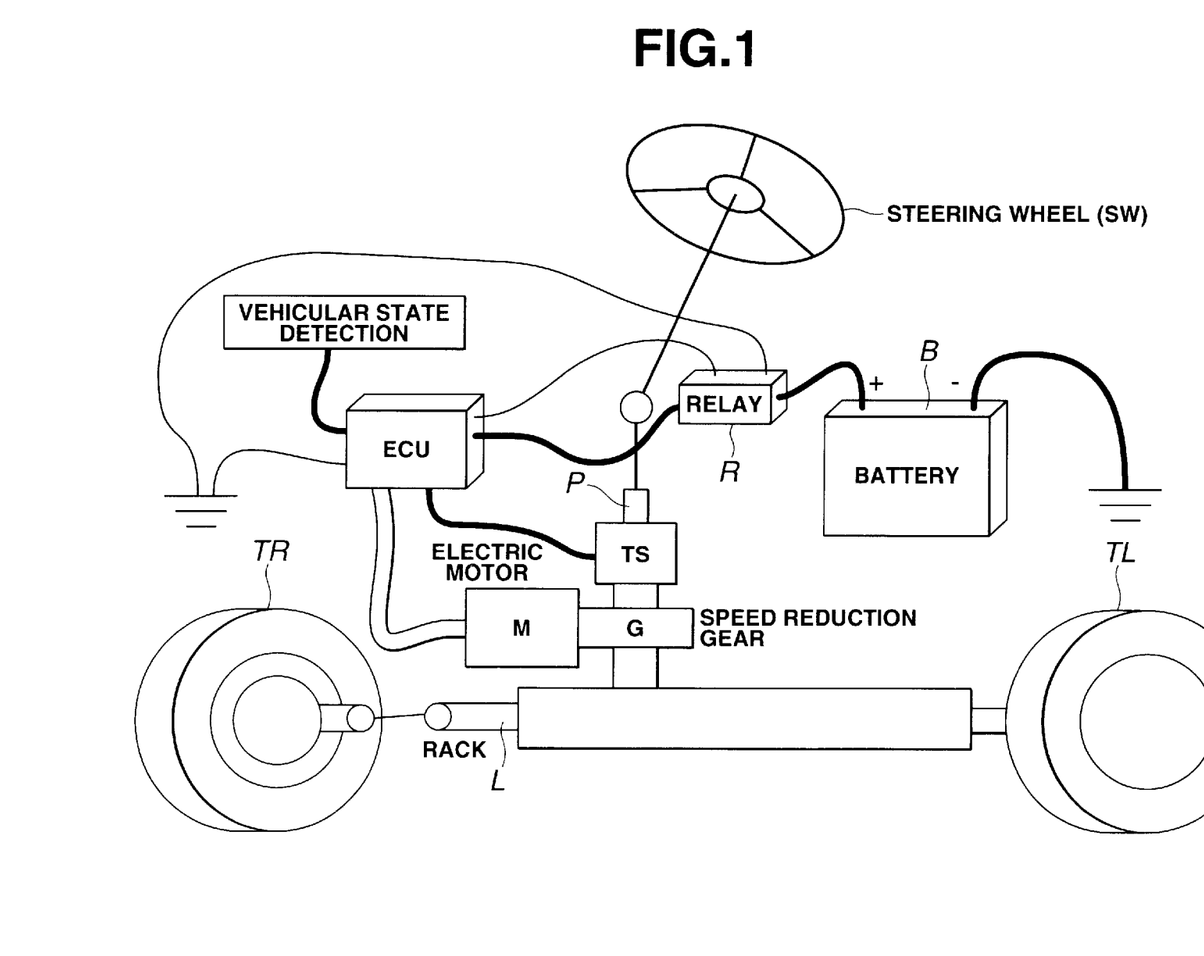
FIG. 1 is a whole configuration view of a motor-driven power-assisted steering system of an automotive vehicle to which a diagnostic apparatus of a first preferred embodiment according to the present invention is applicable.

FIG. 1 shows a whole configuration of a motor driven power-assisted steering system for an automotive vehicle to which a diagnostic apparatus in a first preferred embodiment according to the present invention is applicable.

As shown in FIG. 1, when a steering wheel SW is manually rotated, this manual rotation is converted through a rack L and pinion P into a straight line motion by the rack L. This can change (steering wheel operation) direction of front left and right road wheels TL and TR. In addition, pinion P is rotatable via speed-reduction gear G via an electric motor M so that the power assistance for a steering force generated by a multiplication of the steering wheel can be achieved.

In addition, a drive force exerted by an electric motor (reversible motor) M is controlled on the basis of a signal from a torque sensor TS detecting a manual steering force and steering direction thereof and performs a drive control by a microcomputer A incorporated into a vehicular control unit (called, ECU). This drive control performs an assistance control of a steering force in accordance with the manually set steering direction.

In FIG. 1, R denotes a fail-safe purpose relay and B denotes a vehicular battery.

Figure 2:
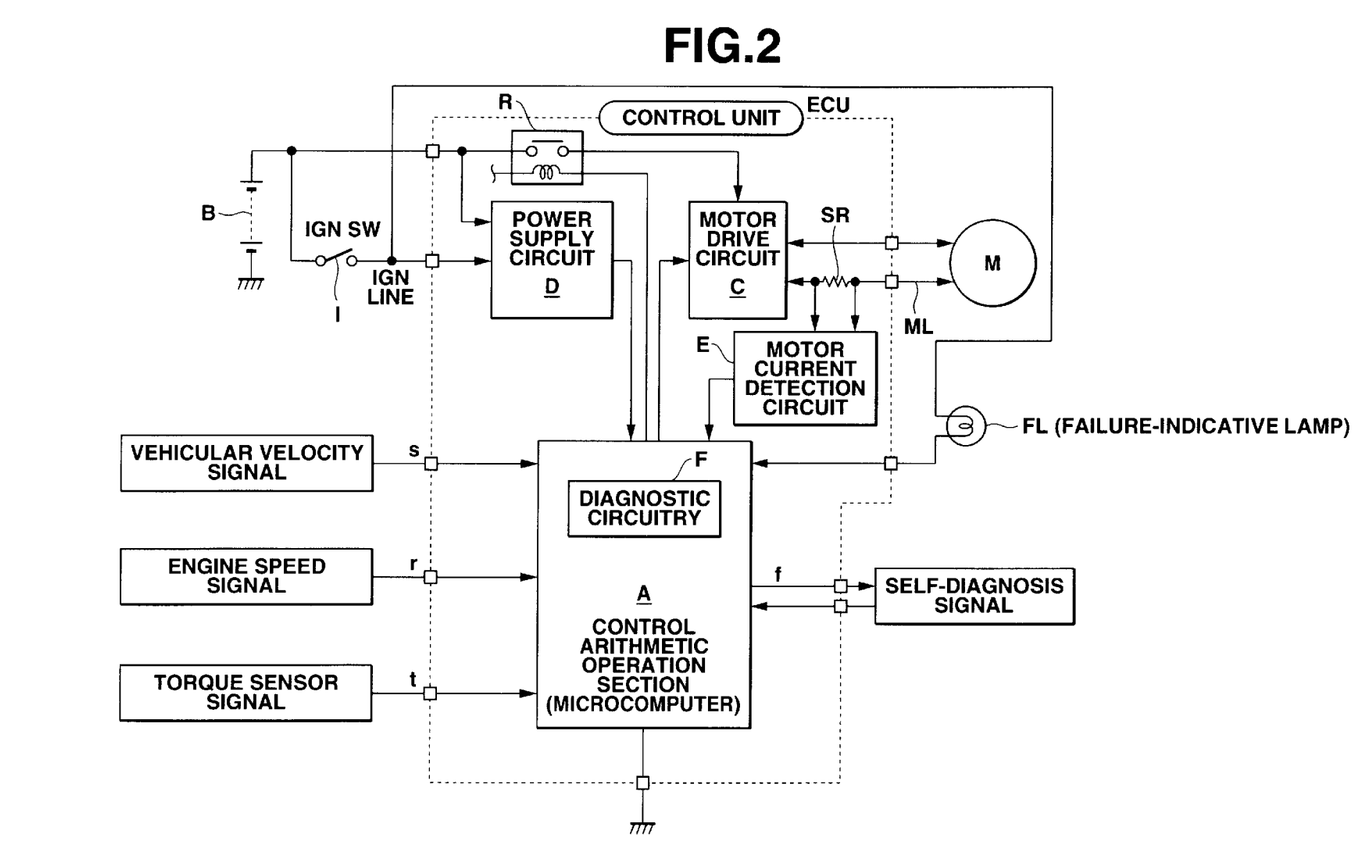
FIG. 2 is a detailed circuit block diagram of the diagnostic apparatus for the motor-driven power-assisted steering system shown in FIG. 1.

Next, FIG. 2 shows a system block diagram of the motor driven power-assisted steering system to which the diagnostic apparatus in the first preferred embodiment according to the present invention is applicable.

Figure 3:
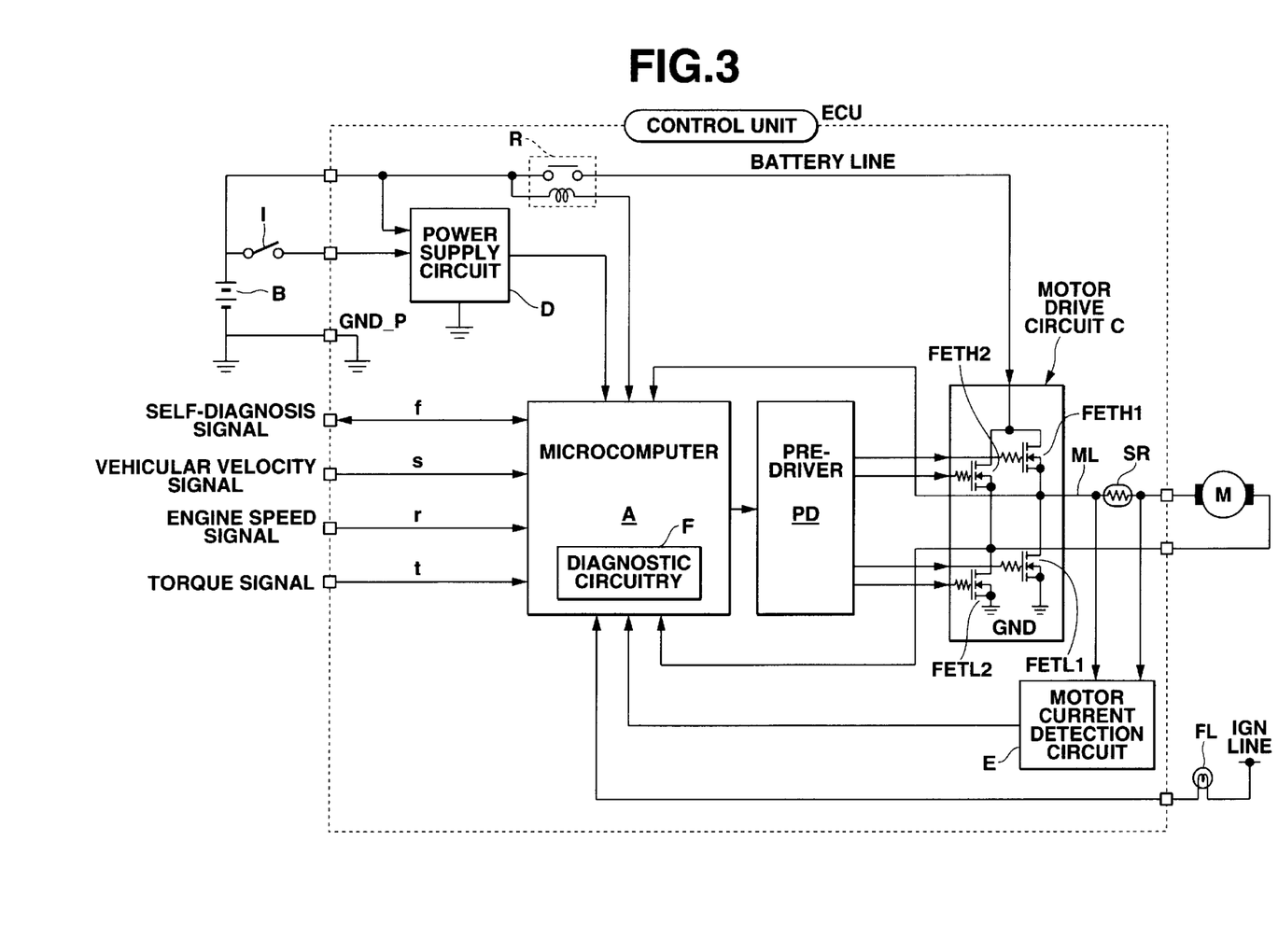
FIG. 3 is a more detailed circuit block diagram of the diagnostic apparatus for the motor-driven power-assisted steering system shown in FIG. 2.

FIG. 3 shows an electric circuit wiring diagram of the motor-driven power-assisted steering system shown in FIG. 2.

As shown in FIGS. 2 and 3, the control unit (ECU) includes: a control/arithmetic operation section (microcomputer) A; a motor drive circuit C; a power supply circuit D; a motor current detecting circuit E; a fail-safe relay R for the fail-safe purpose; and a shunt resistance SR. A diagnostic circuit F is installed.

In FIGS. 2 and 3, I denotes an ignition switch and FL denotes a failure-indicative lamp.

It is noted that the microcomputer A receives a vehicular velocity indicative signal S, an engine speed signal r, a torque signal t from a torque sensor TS, and a self-diagnostic signal f.

In details, the microcomputer A outputs a normal/reverse torque command current Is to motor drive circuit C in accordance with the torque signal t (manual directional and steering force) from the torque signal t from the torque sensor TS.

The motor drive circuit C serves to drivingly control the electric motor M (reversible motor) in either the normal or reverse direction. As shown in FIG. 3, the motor drive circuit C is constituted by an H bridge circuit of drive power supply side switching transistors FET H1 and FET H2 and of ground side switching transistors FET L1 and FET L2. Each switching transistor FET H1 through FET L2 is drivingly controlled in an on-and-off control mode by means of a pre-driver PD on the basis of the normal/reverse torque command current Is from the microcomputer A so that the normal/reverse drive control of electric motor M is carried out in an on-and-off mode.

The fail-safe relay R is intervened in a battery line connecting between the electric motor M and battery B.

That is to say, this relay R serves to disconnect the battery line during the fail-safe mode of the motor-drive power-assisted steering system and an on-and-off control of the relay R is carried out by means of the microcomputer A.

The shunt resistance SR is a resistor serially inserted in a midway through a motor line ML in order to detect a current flowing through the drive motor M.

Figure 4:
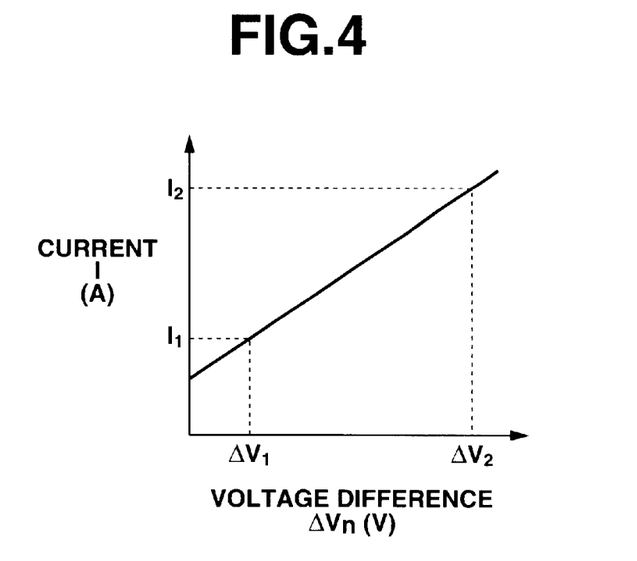
FIG. 4 is a current value conversion graph used in the diagnostic apparatus of the first preferred embodiment shown in FIGS. 1 through 3.

The motor current detector E detects a voltage difference ($\Delta Vn = V1 - V2$) between both ends of the shunt resistance SR. A current value (normal/reverse drive current) I supplied to the electric motor M is determined according to a current value conversion graph shown in FIG. 4 according to the voltage difference (voltage drop value) $\Delta Vn$.

Figure 5:
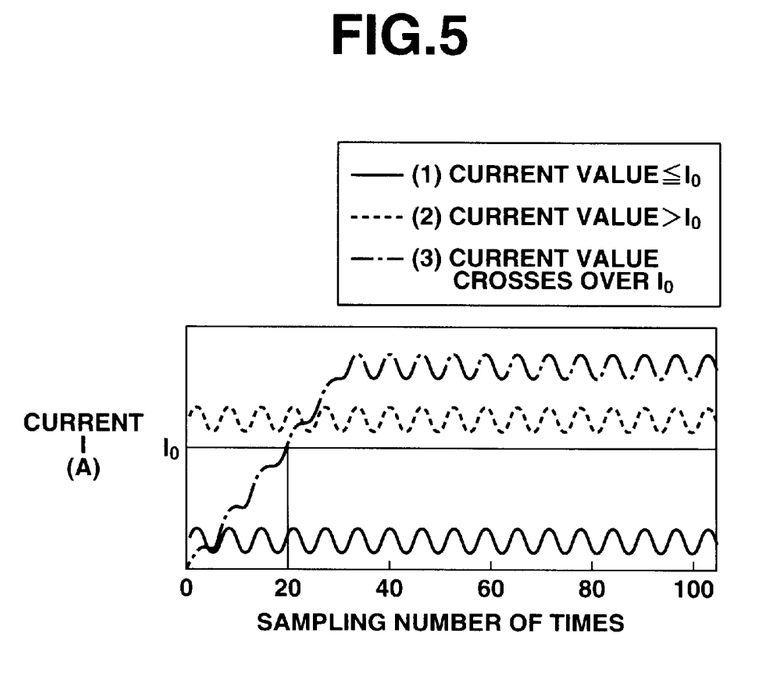
FIG. 5 is a timing chart representing the current value I with number of times sampling is carried out during an abnormality determination as a time axis.
Figure 6:
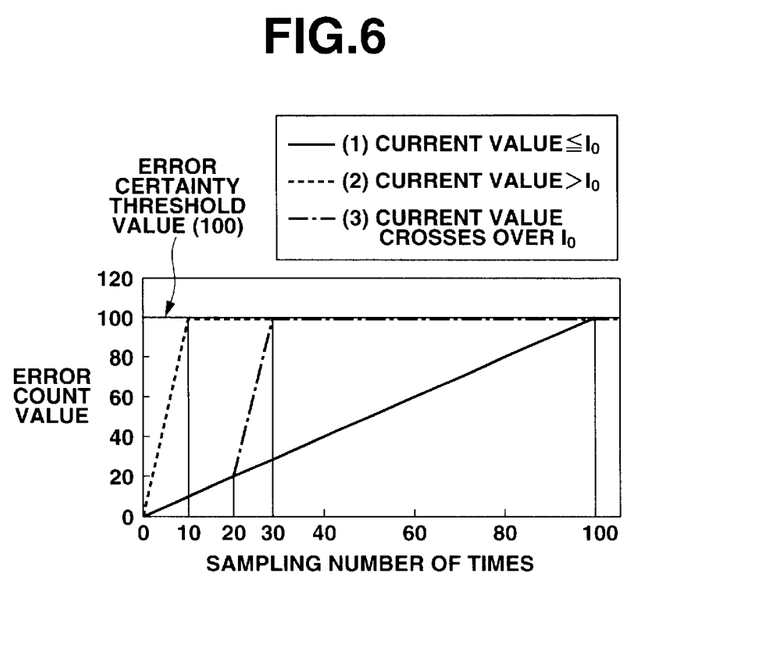
FIG. 6 is another timing chart representing the current value I with number of times sampling is carried out during an abnormality determination as a time axis.

The diagnostic circuitry F detects a state in which the current value I detected by the motor current detection circuit E is a reverse current to the normal/reverse torque command current Is and determines an abnormality of the power-assisted steering system depending on whether the state is in excess of a predetermined abnormality criterion. The contents of determination in the diagnostic circuitry F will be described below with reference to FIGS. 5 and 6. FIG. 5 shows a timing chart representing the current value I with the number of times a sampling for the current value I at a time of the abnormality determination is carried out as a time axis. FIG. 6 shows a timing chart representing an error count value with the number of times the sampling is carried out as the time axis during the abnormality determination.

That is to say, in the first preferred embodiment according to the present invention, the abnormality occurrence determination criterion is the number of times the current value I reverse to the normal/reverse torque command current Is is generated. The abnormality determination of the normal/reverse steering system is carried out by determining whether a total (error count value) of the number of times the reverse current I has been generated are counted for each predetermined sampling time t are in excess of 100 counts (error certainty threshold value).

The above-described diagnostic circuitry F repeats the abnormality determination for each predetermined period of time which is longer than an product of the other predetermined number for the abnormality determination by the sampling time t.

In addition, the above-described diagnostic circuitry F counts in an accumulation manner for each IO count whenever the reverse current value I is once generated, as denoted by a broken line of FIG. 5 in a case where an absolute value of the current value I detected by the motor current detecting circuit E is in excess of IO. This causes the number of times the sampling is carried out to be ten times and the error count value to be equal to or larger than the error certainty threshold value (100). Consequently, an earlier abnormality determination can be carried out. In other words, a high sensitivity in the abnormality determination criterion can be achieved.

As denoted by a solid line in FIG. 5, in a case where the absolute value of the detected current value I by the motor current detection circuit E is equal to or below IO, such a modification as an accumulation count for each one count of the error count for each count of the error count value is made so that when the number of times the sampling has been carried out has reached to 100 number of times, the error count value C indicates a value equal to or larger than the error certainty threshold value (100). That is to say, the sensitivity in the abnormality determination criterion can be increased.

Dot-and-dash lines in FIGS. 5 and 6 denote varied states of the current value I in which the current crosses over $I_0$.

As described above, in the diagnostic apparatus for the motor-driven power-assisted steering apparatus in the first embodiment according to the present invention, when the steering torque is small and the absolute value of the current value I is small, the error count value is counted in the accumulation manner for each count so that the sensitivity in abnormality determination can be reduced. Hence, the erroneous determination of the abnormality occurrence due to an influence of the noise included in the current value I can be reduced. When the power assistance steering is required, i.e., when the steering torque is so large that the absolute value of the current value I is large, $I_0$ counts of the error count value is counted in the accumulation manner to maintain the high sensitivity in the abnormal determination. Hence, the abnormal state is determined at an earlier time and the fail-safe structure is activated so that the power-assisted steering operation is halted.

In addition, as described hereinabove, since the error certainty threshold value itself is maintained at a predetermined time (100) and the current value I is varied periodically at a large amplitude, a stable abnormality determination can be achieved.

Since the number of times the current value I which is reverse to the normal/reverse torque command current Is has been developed serves as the abnormality determination criterion, such as erroneous determination as would be developed when the reverse current value I is determined by the corresponding threshold value even if the reverse current value I instantaneously due to the noise influence is caused to flow can be prevented from occurring so that the abnormal condition only can be detected without failure.

Since the abnormality occurrence determination is made depending on whether the total number of times the current value I reverse to the normal/reverse torque command current is developed and is counted for each predetermined sampling time t is in excess of the error certainty threshold value, the determination of whether the abnormality occurs can be made since the number of times per sampling period t are counted even if such a continuation state as that in which the reverse current value I is developed so that the abnormality state can be determined.

Furthermore, even if the abnormality occurrence determination is repeated whenever a predetermined period of time has passed longer than the product of the other predetermined number for the abnormality determination by the sampling time so that the state in which the reverse current value I is developed is continued, the number of times are counted and the abnormality occurrence determination is carried out for each constant period of time.

Consequently, the abnormality state can stably be determined.

(Second Embodiment)

The diagnostic apparatus for the motor driven power-assisted steering system in a second preferred embodiment according to the present invention is generally the same as that described in the first embodiment. However, a part of method for modifying the sensitivity in the abnormality determination criterion is made different from the first embodiment.

Figure 7:
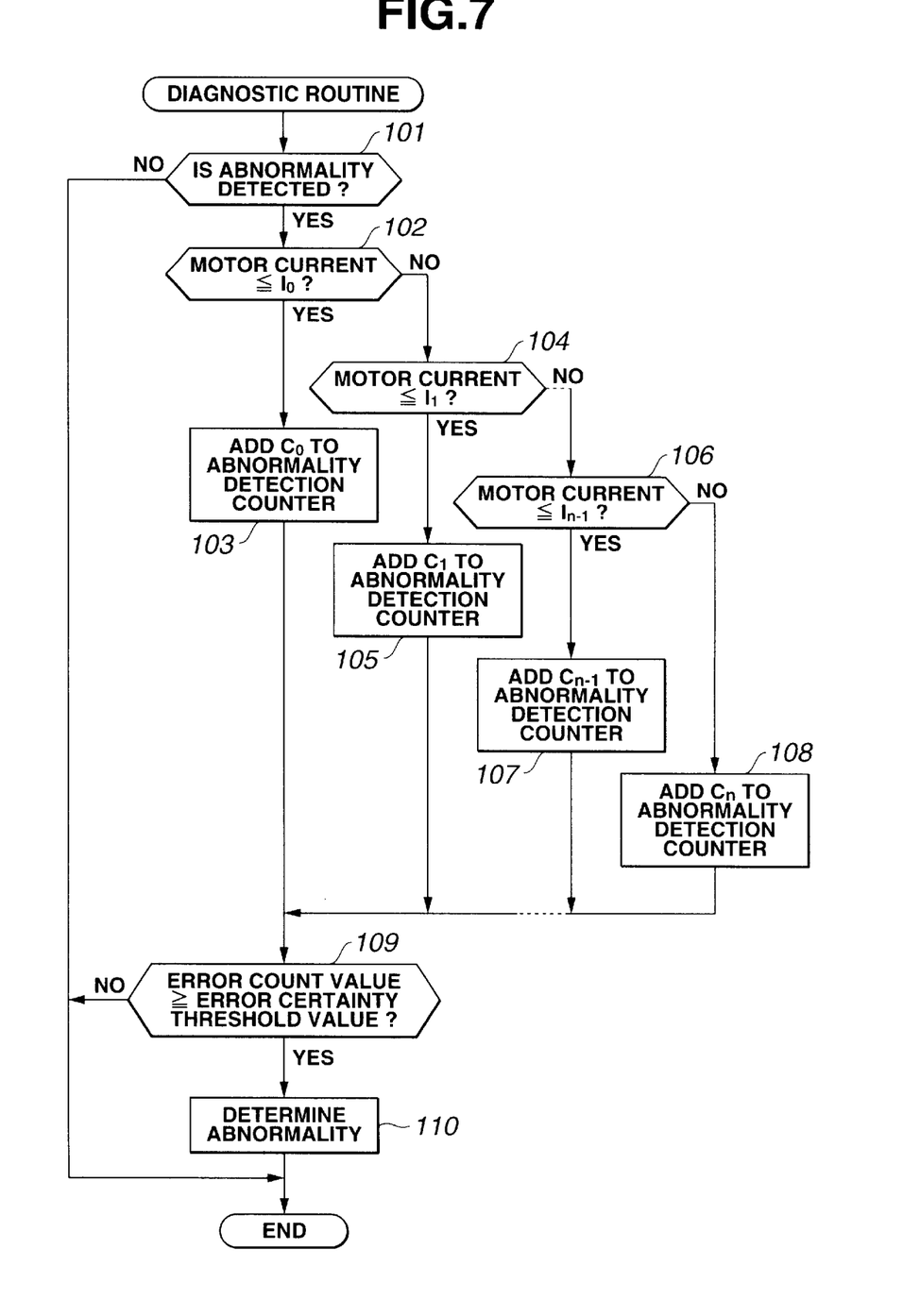
FIG. 7 is an operational flowchart representing a method of modifying a sensitivity in an abnormality determination criterion of the motor-driven power-assisted steering system in a second preferred embodiment according to the present invention.

Hence, an operation in the second embodiment will be described with reference to a flowchart of FIG. 7.

At a step 101, the diagnostic circuitry F determines whether an abnormality (an abnormal operation or failure) in the power-assisted steering system has been detected.

If Yes at step 101, the routine goes to a step 102.

If No at step 101, the routine jumps to an end step and this present routine is ended.

At step 102, the diagnostic apparatus determines whether the motor current (the current value I supplied to the motor M) is equal to or below $I_0$. If Yes at step 102, the routine goes to step 103. At step 103, the error count value $C_0$ is counted in the accumulation manner and the routine goes to a step 109. If No at step 102, the routine goes to a step 104.

At step 104, the motor current I is determined whether it is equal to or below than $I_1$. If Yes at step 104, the routine goes to a step 105 to accumulate the error count value $C_1$ and, thereafter, the routine goes to a step 109. If No at step 104, the routine goes to a step 106.

At step 106, the diagnostic circuitry F determines whether the motor current I is equal to or below $I_{n-1}$.

If Yes at step 106, the routine goes to a step 107 at which the error count value $C_{n-1}$ is accumulated and the routine goes to a step 109. If No at step 106, the routine goes to a step 108. At step 108, after the error count value $C_n$ is accumulated, the routine goes to a step 109. At the step 109, diagnostic circuitry F determines whether the error count value is equal to or larger than the error certainty threshold value.

If Yes at step 109, after the routine goes to a step 110 to ensure the abnormality in the power-assisted steering system, this routine is ended. If No at step 109, this routine is directly ended.

It is noted that a relationship between each current value of motor $I_0, I_1, I_{n-1}$ and error count value $C_0, C_1, - - -, C_{n-1}$ and $C_n$ will be described as follows:

$I_0 < I_1 < - - - < I_{n-1}$;

$C_0 < C_1 < - - - < C_{n-1} < C_n$

In this way, such an incremental count number $C_0, C_1, - - -, C_{n-1}, C_n$ on the number of times the normal/reverse drive current which is reverse to the normal/reverse drive command current is developed as described above is varied in the decrease direction as the motor drive current $I_{n-1}, - - -, I_1, I_0$ becomes reduced.

In details, in the second embodiment, the switching in the sensitivity in the abnormality determination criterion is carried out at a multiple stage.

It is noted that the error count value is reset to zero when the normal/reverse drive current whose direction is the same as the normal/reverse drive command current is developed.

Hence, the same advantages as those of the first embodiment can be obtained in the second embodiment and a more accurate determination of abnormality can be achieved.

(Third Embodiment)

Figure 8:
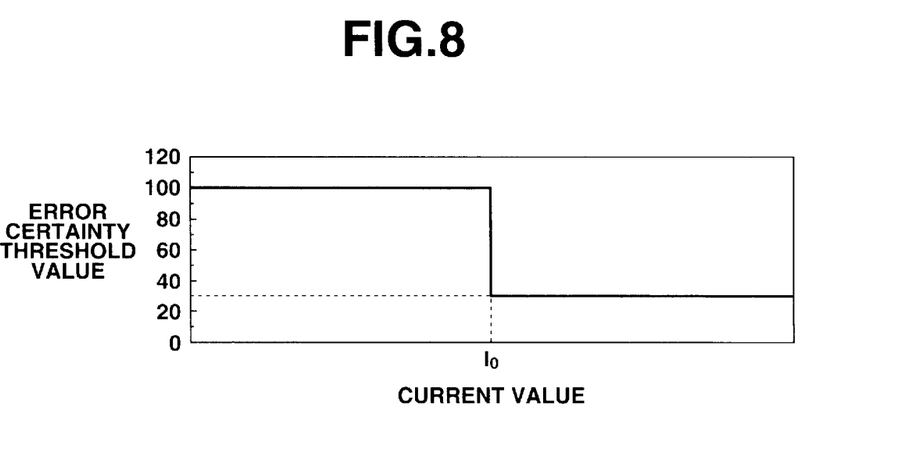
FIG. 8 is a characteristic graph of an error certainty threshold value variable characteristic of the diagnostic apparatus with respect to the current value in a third preferred embodiment according to the present invention.

As shown in FIG. 8, the diagnostic circuitry F in the diagnostic apparatus for the motor driven power-assisted steering system in a third preferred embodiment sets the error certainty threshold value to 30 in a case where the absolute value of current value I detected by the motor current detection circuit E is in excess of $I_0$. Consequently, the abnormality determination is made at the earlier stage. That is to say, the sensitivity in the abnormality determination criterion can be enhanced.

On the contrary, in a case where, as shown in FIG. 8, the absolute value of the current value I detected by the motor current detection circuitry E is equal to or lower than $I_0$, the error certainty threshold value is set to 100. Thus, a discreet or careful abnormality determination can be carried out. That is to say, the sensitivity in the abnormality determination criterion can be reduced.

Figure 9:
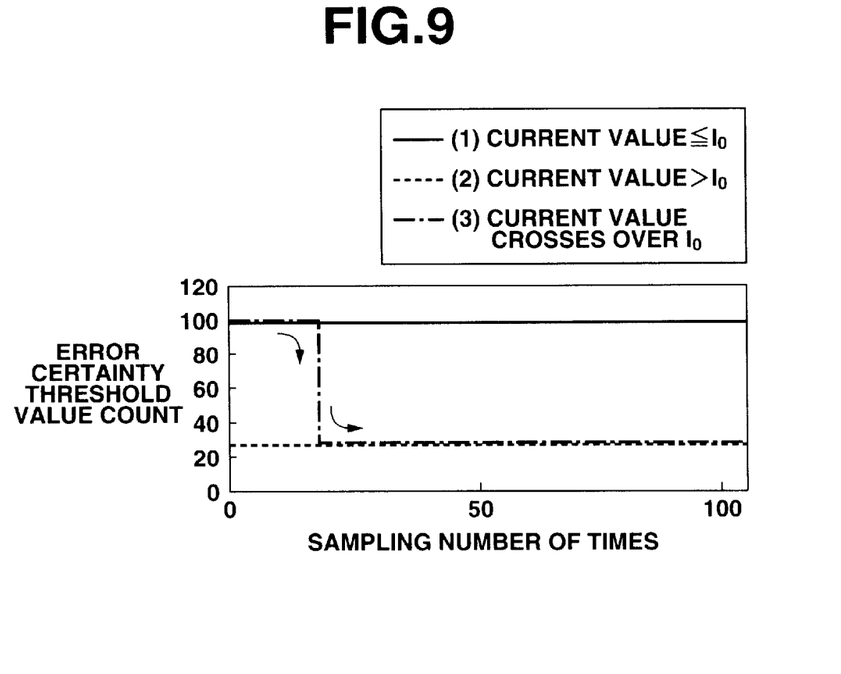
FIG. 9 is a characteristic graph of an error certainty threshold value count value of the diagnostic apparatus with the number of time the sampling is carried out during the abnormality determination as the time axis in the third preferred embodiment according to the present invention.

FIG. 9 shows a timing chart representing the error certainty threshold value count with the number of times the sampling is carried out during the abnormality determination.

Figure 10:
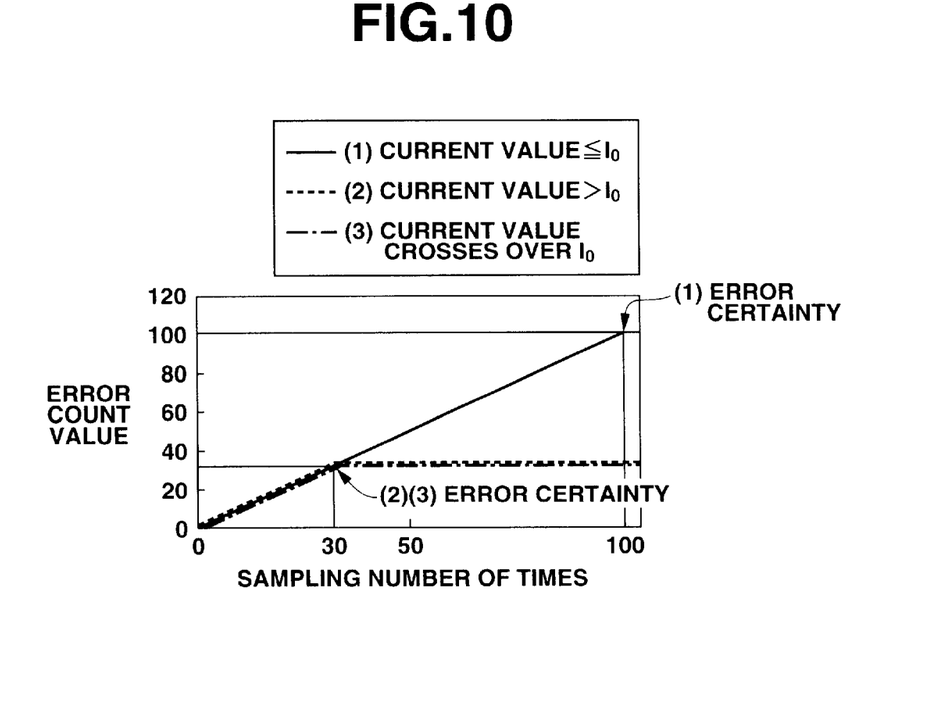
FIG. 10 is a characteristic graph of an error count value of the diagnostic apparatus with the number of time the sampling is carried out during the abnormality determination as the time axis in the third preferred embodiment according to the present invention.

FIG. 10 shows a timing chart representing the error count value with the number of times the sampling is carried out during the abnormality determination.

In FIGS. 9 and 10, a solid line denotes the absolute value of the current value I which is equal to or below $I_0$. In this case, the abnormality determination is made at the first time when the error count value indicates 100. In FIGS. 9 and 10, a broken line denotes the absolute value of the current value I which is in excess of $I_0$. In this case, the abnormality determination is made at a time at which the error count value indicates 30. In FIGS. 9 and 10, a dot-and-dash line denotes the absolute value of the current value I which is in excess of $I_0$ from a state in which the absolute value thereof is equal to or smaller than $I_0$. In this case, the abnormality determination is carried out at the time at which the error count value indicates 30.

Hence, the same advantages as described in the first embodiment can be obtained in the third embodiment. In addition, even if the current value I is periodically varied at a large amplitude, the abnormality determination criterion is variably set in accordance with the variation so that the abnormal determination can stably be achieved.

(Fourth Embodiment)

The diagnostic circuitry F of the diagnostic apparatus for the motor driven power-assisted steering system is generally the same as the diagnostic apparatus for the motor driven power-assisted steering system in the third embodiment according to the present invention. Since, from the contents of diagnostic circuitry F, a part of modifying the sensitivity of abnormality determination criterion is made different. The fourth embodiment will be described with reference to FIG. 11 which shows the error certainty threshold value variable characteristic.

Figure 11:
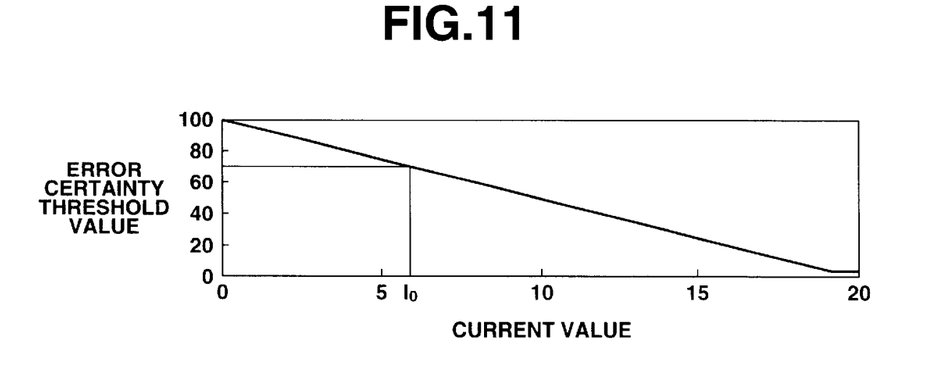
FIG. 11 is a characteristic graph of an error certainty threshold value variable characteristic of the diagnostic apparatus with respect to the current value in a fourth preferred embodiment according to the present invention.

That is to say, in the diagnostic circuitry F in the fourth embodiment according to the present invention, when the absolute value of current value I detected by the motor current detection circuit E indicates zero, the error certainty value is maximum (100) and is set so that the error certainty threshold value is decreased in reverse proportion to the increase in absolute value of current value I.

Figure 12:
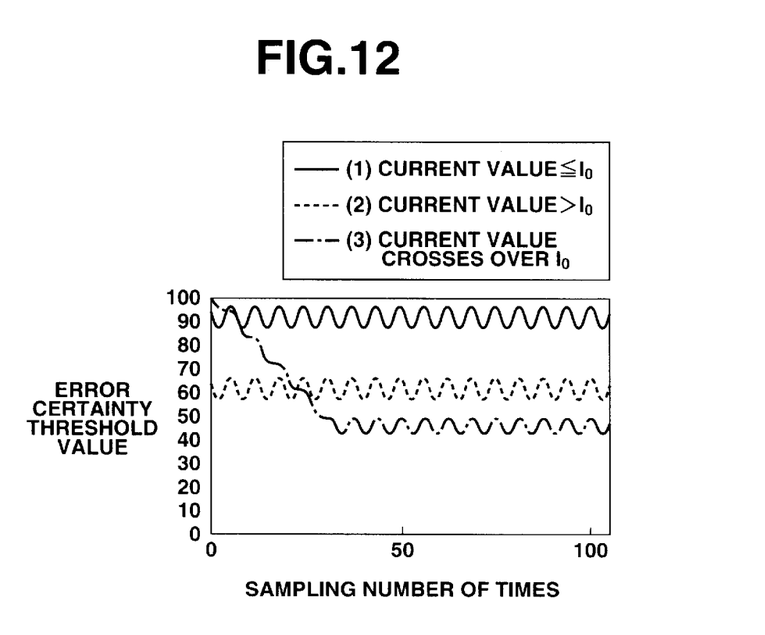
FIG. 12 is a timing chart representing the error certainty threshold value with the number of times the sampling is carried out during the abnormality determination as the time axis in the diagnostic apparatus of the fourth embodiment according to the present invention.

It is noted that FIG. 12 shows a timing chart representing the error certainty threshold value with the number of times the sampling is carried out as a time axis. In FIG. 12, the solid line denotes an absolute value of current value I which is equal to or smaller than $I_0$, the dot line denotes the absolute value of current value I which is in excess of $I_0$ and the dot-and-dash line denotes the absolute value of current value I which crosses from the state in which the absolute value of current value I over $I_0$.

Hence, the same advantages as these described in the third embodiment according to the present invention can be achieved and a more accurate abnormality determination can be made.

Although the invention has been described above by reference to certain embodiment of the invention, the invention is not limited to the embodiments described above. Modifications and variations of the embodiments described above will occur to those skilled in the art in the light of the above teachings.

For example, although, in each embodiment, the number of times the reverse current value I to the normal/reverse drive torque command current Is is set as the abnormality determination criterion in the diagnostic circuitry F, a time duration during which a current value I reverse to the normal/reverse drive torque command current Is may be set as the abnormality determination criterion.

In addition, in each embodiment, the abnormality determination is made by detecting the number of times the current value I which is reverse to the normal/reverse torque command current Is is developed. A dead zone threshold value may be provided against the normal/reverse torque command current Is and the generation of the reverse current value I may be detected only when the reverse current value I is in excess of this dead zone threshold value.

The entire contents of a Japanese Patent Application No. 2000-181907 (filed in Japan on Jun. 16, 2000) are herein incorporated by reference. Although the invention has been described above by reference to certain embodiment of the invention, the invention is not limited to the embodiments described above. The scope of the invention is defined with reference to the following claims.

What is claimed is:

1. A diagnostic apparatus for a motor driven power-assisted steering system of an automotive vehicle, comprising:

a motor controlling section that outputs a rotational direction drive command current to a motor drive circuit connected to an electric reversible motor to regulate a rotational direction of the electric motor in accordance with the rotational direction drive command current;

a drive current detection circuit to detect magnitude and direction of a rotational direction drive current flowing through the motor; and an abnormality determining section that detects a state in which the detected rotational direction drive current indicates a direction opposite to the direction of the rotational direction drive command current and determines whether the state is in excess of a predetermined abnormality determination criterion so as to determine an occurrence of an abnormality of the power-assisted steering system, the abnormality determining section comprising a sensitivity reducing section that lowers a sensitivity of the abnormality determination criterion as an absolute value of the detected rotational direction drive current becomes smaller.

2. A diagnostic apparatus for a motor driven power-assisted steering system of an automotive vehicle as claimed in claim 1, wherein the predetermined abnormality determination criterion is a number of times the rotational direction drive current is reverse to the rotational direction drive command current and the abnormality determining section determines whether the number of times the rotational direction drive current is reverse to the rotational direction drive command current has exceeded a predetermined number of times so as to determine whether the abnormality occurs in the power-assisted steering system.

3. A diagnostic apparatus for a motor driven power-assisted steering system of an automotive vehicle as claimed in claim 2, wherein the sensitivity reducing section lowers the sensitivity in the abnormal determination criterion by increasing the abnormality determination criterion, as compared with a case of a larger absolute value of the rotational directional drive current, when the absolute value of the rotational direction drive current becomes smaller.

4. A diagnostic apparatus for a motor driven power-assisted steering system of an automotive vehicle as claimed in claim 2, wherein the sensitivity reducing section lowers the sensitivity in the abnormal determination criterion by decreasing an incremental count number on the number of times the rotational directional drive current is reverse to the rotational direction drive command current, as compared with a case of a larger absolute value of the rotational direction drive current, when the absolute value of the rotational direction drive current becomes smaller.

5. A diagnostic apparatus for a motor driven power-assisted steering system of an automotive vehicle as claimed in claim 4, wherein the abnormality determining section comprises diagnostic circuitry installed in the microcomputer together with the motor controlling section and the drive current detection section comprises a voltage difference measuring section that measures a voltage difference between both ends of a resistor interposed between the motor and converts the voltage difference therebetween into a current value I which is caused to flow through the motor.

6. A diagnostic apparatus for a motor driven power-assisted steering system of an automotive vehicle as claimed in claim 2, wherein the abnormality determining section determines the occurrence in the abnormality of the motor-driven power-assisted steering system by determining whether a total of the number of times the rotational direction drive current is reverse to the rotational direction drive command current exceeds an abnormal determination criterion in a predetermined sampling time.

7. A diagnostic apparatus for a motor driven power-assisted steering system of an automotive vehicle as claimed in claim 6, wherein the abnormality determining section repeats the abnormality determination for a predetermined time longer than a product of the other predetermined number for the abnormality determination by the sampling time.

8. A diagnostic apparatus for a motor driven power-assisted steering system of an automotive vehicle as claimed in claim 6, wherein the abnormality determining section comprises a counter to count the number of times the rotational direction drive current is reverse to the rotational directional drive command current for each predetermined sampling time in an accumulation manner, the counter being reset to zero when the direction of the rotational direction drive current is the same as the rotational direction drive command current.

9. A diagnostic apparatus for a motor driven power-assisted steering system of an automotive vehicle as claimed in claim 1, wherein the rotational direction drive torque command value is generated by the motor controlling section constituted by a microcomputer and is supplied to the motor drive circuit comprising an H bridge circuit with the electric motor.

10. A diagnostic apparatus for a motor driven power-assisted steering system of an automotive vehicle as claimed in claim 1 further comprising a system disconnecting section that disconnects a battery line connecting the electric motor to a battery to execute a system interruption of the power-assisted steering system when the abnormality determining section determines the occurrence of the abnormality in the power-assisted steering system.

11. A diagnostic apparatus for a motor driven power-assisted steering system of an automotive vehicle as claimed in claim 1, wherein the abnormality determining section detects the state in which the detected rotational direction drive current indicates a direction opposite to the direction of the rotational direction drive command current by a comparison of the rotational direction drive current and the rotational direction drive command current.

12. A diagnostic apparatus for a motor driven power-assisted steering system of an automotive vehicle as claimed in claim 11, wherein the detected rotational direction drive current corresponds to a magnitude and a direction of an actual drive torque.

13. A diagnostic apparatus for a motor driven power-assisted steering system of an automotive vehicle as claimed in claim 12, wherein the electric motor is a DC motor.

14. A diagnostic apparatus for motor driven power-assisted steering system of an automotive vehicle, comprising:
  motor controlling means for outputting a rotational direction drive command current to a motor drive circuit connected to an electric reversible motor to regulate a rotational drive of the electric motor and a direction thereof in accordance with the rotational direction drive command current:
  drive current detecting means for detecting a magnitude and a direction of a rotational direction drive current flowing through the motor;
  abnormality determining means for detecting a state in which the detected rotational direction drive current indicates a direction opposite to the direction of the rotational direction drive command current and for determining whether the state is in excess of a predetermined abnormality determination criterion so as to determine an occurrence of an abnormality in the power-assisted steering system, the abnormality determining means comprising sensitivity reducing means for lowering a sensitivity of the abnormality determination criterion as an absolute value of the detected rotational direction drive current becomes smaller.

15. A diagnostic method for a motor driven power-assisted steering system of an automotive vehicle, comprising:
  outputting a rotational direction drive command current to a motor drive circuit connected to an electric reversible motor to regulate a rotational direction of the electric motor in accordance with the rotational direction drive command current;
  detecting a rotational direction drive current flowing through the motor;
  detecting a state in which the detected rotational direction drive current indicates a direction opposite to the direction of the rotational direction drive command current;
  determining whether the state is in excess of a predetermined abnormality determination criterion so as to determine an occurrence of an abnormality of the power-assisted steering system; and lowering a sensitivity of the abnormality determination criterion as an absolute value of the detected rotational direction drive current becomes smaller.

16. A diagnostic method for a motor driven power-assisted steering system of an automotive vehicle as claimed in claim 15, wherein the predetermined abnormality determination criterion is a number of times the rotational direction drive current is reverse to the rotational direction drive command current and, at the abnormality determining step, a determination is made of whether the number of times the rotational direction drive current is reverse to the rotational direction drive command current has exceeded a predetermined number of times so as to determine whether the abnormality occurs in the power-assisted steering system.

17. A diagnostic method for a motor driven power-assisted steering system of an automotive vehicle as claimed in claim 16, wherein, at the abnormality determining step, the occurrence in the abnormality of the motor-driven power-assisted steering system is determined by determining whether a total of the number of times the rotational direction drive current is reverse to the rotational direction drive command current exceeds an abnormal determination criterion in a predetermined sampling time.

18. A diagnostic method for a motor driven power-assisted steering system of an automotive vehicle as claimed in claim 16, wherein, at the abnormality determining step, the abnormality determination is repeated for a predetermined time longer than a product of the other predetermined number for the abnormality determination by the sampling time.

19. A diagnostic method for a motor driven power-assisted steering system of an automotive vehicle as claimed in claim 16, wherein, at the abnormality determining step, the sensitivity in the abnormal determination criterion is lowered by decreasing an incremental count number on the number of times the rotational direction drive current is reverse to the rotational direction drive torque command current, as compared with a case of a larger absolute value of the rotational direction drive current, when the absolute value of the rotational direction drive current becomes smaller.

20. A diagnostic method for a motor driven power-assisted steering system of an automotive vehicle as claimed in claim 16, wherein, at the abnormality determining step, the sensitivity in the abnormal determination criterion is lowered by increasing the abnormality determination criterion, as compared with a case of a larger absolute value of the rotational direction drive current, when the absolute value of the rotational direction drive current becomes smaller.

* * * * *